(12) United States Patent
Eitoku et al.

(10) Patent No.: US 11,431,762 B2
(45) Date of Patent: Aug. 30, 2022

(54) GATEWAY DEVICE AND MONITORING METHOD

(71) Applicant: Nippon Telegraph and Telephone Corporation, Tokyo (JP)

(72) Inventors: Haruka Eitoku, Tokyo (JP); Kodai Yamamoto, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 204 days.

(21) Appl. No.: 16/980,242

(22) PCT Filed: Mar. 12, 2019

(86) PCT No.: PCT/JP2019/009894
§ 371 (c)(1),
(2) Date: Sep. 11, 2020

(87) PCT Pub. No.: WO2019/176906
PCT Pub. Date: Sep. 19, 2019

(65) Prior Publication Data
US 2021/0037062 A1 Feb. 4, 2021

(30) Foreign Application Priority Data

Mar. 13, 2018 (JP) .............................. JP2018-045111

(51) Int. Cl.
*H04L 65/10* (2022.01)
*H04L 65/1033* (2022.01)
(Continued)

(52) U.S. Cl.
CPC ...... *H04L 65/1033* (2013.01); *H04L 65/1104* (2022.05); *H04M 3/241* (2013.01)

(58) Field of Classification Search
CPC ............ H04L 65/1033; H04L 65/1104; H04L 43/0829; H04L 43/0852; H04L 65/1045; H04L 65/1083
See application file for complete search history.

(56) References Cited

U.S. PATENT DOCUMENTS

2011/0142103 A1 6/2011 Suzuki
2016/0373585 A1\* 12/2016 Sharma ................. H04W 76/25

FOREIGN PATENT DOCUMENTS

JP 2007-221217 8/2007
JP 2011-124889 6/2011

OTHER PUBLICATIONS

Community.cisco.com, [online], "Calls Placed on Hold on a Cartier Connection to a Static IP Phone Service within 30 Seconds," 2016, retrieved on Jul. 14, 2020, retrieved from URL<https://community.cisco.com/t5/>, 5 pages (with English Translation).
(Continued)

*Primary Examiner* — Brenda H Pham
(74) *Attorney, Agent, or Firm* — Fish & Richardson P.C.

(57) ABSTRACT

Unexpected call disconnection during normal time is prevented. When a gateway device 1 installed on a POI border receives RTP packets even though reception of RTCP packets is stopped, the gateway device 1 generates RTCP packets and sends out the RTCP packets to the gateway device 1's own network side or the gateway device 1 generates a call control signal showing that media transfer is continued and sends out the call control signal to the gateway device 1's own network side. Thereby, even in the case of performing interruption monitoring of RTCP packets within the gateway device 1's own network, it is possible to prevent unexpected call disconnection during normal time accompanying change in RTCP packet sending-out conditions.

11 Claims, 2 Drawing Sheets

(51) Int. Cl.
*H04M 3/24* (2006.01)
*H04L 65/1104* (2022.01)

(56) References Cited

OTHER PUBLICATIONS

Handley et al., "SDP: Session Description Protocol," Network Working Group, Apr. 1998, 43 pages.
Rosenberg et al., "An Offer/An Answer Model with the Session Description Protocol (SDP)," Network Working Group, Jun. 2002, 26 pages.
Rosenberg et al., "SIP: Session Initiation Protocol," Network Working Group, Jun. 2002, 207 pages.
Schulzrinne et al., "RTP: A Transport Protocol for Real-Time Applications," Network Working Group, Jul. 2003, 89 pages.

\* cited by examiner

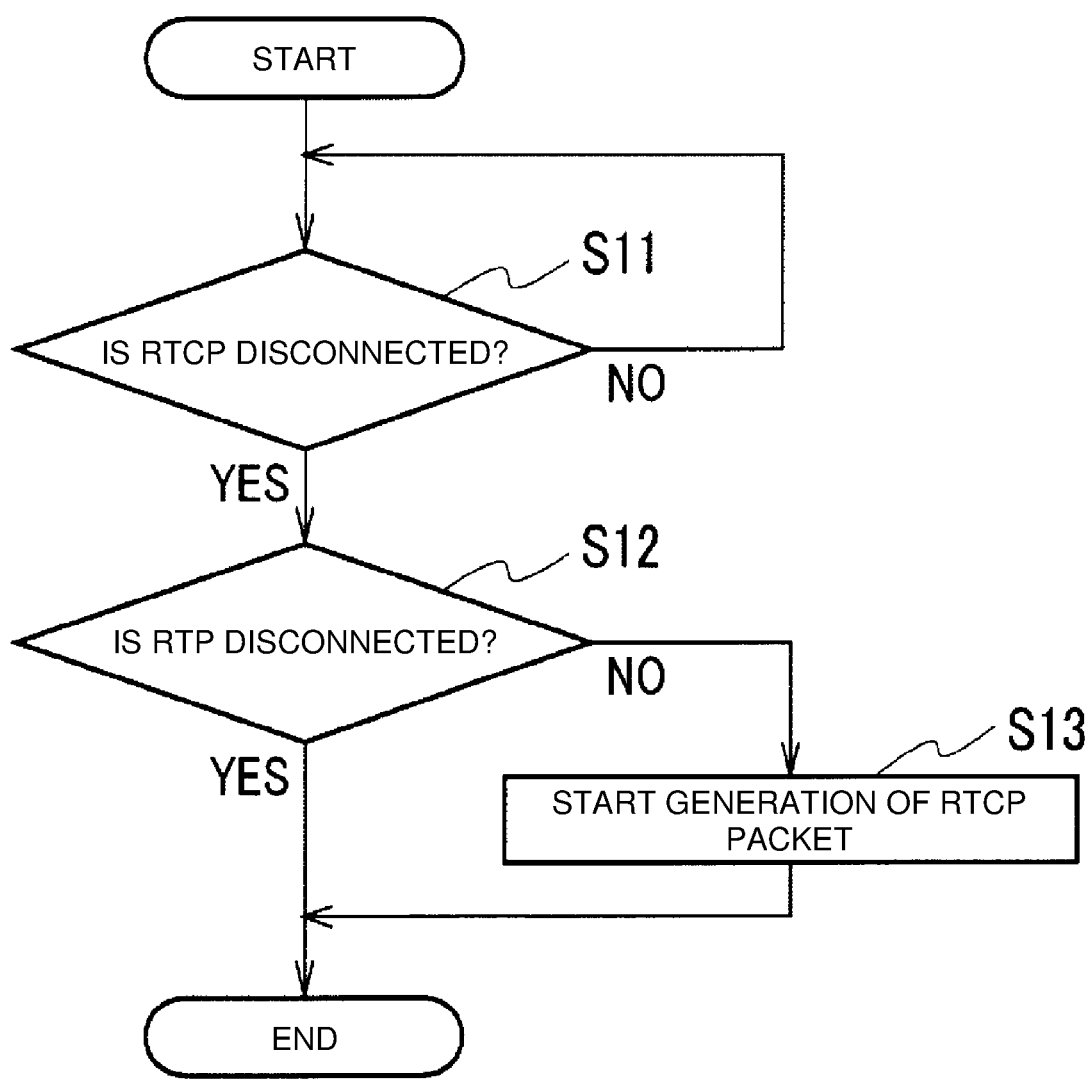

GATEWAY DEVICE AND MONITORING METHOD

CROSS-REFERENCE TO RELATED APPLICATIONS

This application is a National Stage application under 35 U.S.C. § 371 of International Application No. PCT/JP2019/009894, having an International Filing Date of Mar. 12, 2019, which claims priority to Japanese Application Serial No. 2018-045111, filed on Mar. 13, 2018. The disclosure of the prior application is considered part of the disclosure of this application, and is incorporated in its entirety into this application.

TECHNICAL FIELD

The present invention relates to a technique for monitoring communication of media to prevent call disconnection.

BACKGROUND ART

SIP (Session Initiation Protocol) is a protocol standardized by IETF (Internet Engineering Task Force) and is created to perform multimedia session of voice/video. At the time of actually performing communication, conditions for media (voice/video) are written in SDP (Session Description Protocol), and media packets are transferred using RTP (Real-time Transport Protocol) and RTCP (Real-time Transport Control Protocol).

RTP is used to deliver media in real time. Since RTP includes information about detection of packet loss, provision of packet reproduction timing information and media formats, RTP is a more reliable protocol when compared with UDP (User Datagram Protocol).

RTCP is defined as a protocol for controlling session for RTP and is capable of providing a mechanism for feeding back information about quality of a media stream (jitter, packet length, round-trip delay and the like) from a reception side to a transmission side. In general, since RTCP is a packet for transmitting/receiving control information about RTP, it is undesirable that RTCP itself influences quality of RTP transmission/reception. It is recommended that a percentage of a RTCP packet occupying a band of RTP is 5% at the maximum.

At the time of starting communication source terminal transmits information about media to be used for the communication and various kinds of parameters of the media as an SDP offer. A destination-side terminal that receives the offer selects therefrom media conditions to be used for the communication and returns the media conditions as an SDP answer.

After the communication is established, a SIP signal is distributed on a C-plane to control the call, and the media are caused to be distributed by RTP/RTCP on a U-plane.

A communication carrier can monitor whether media (RTP/RTCP) are distributed without interruption on the U-plane for utilization for quality assurance of charging and services. For example, the interruption monitoring function of an NNI-GW (Network Network Interface-Gateway) operates as below. When a trigger condition (for example, reception of the first RTP/RTCP packet) is satisfied, a direction and time are specified from the C-plane, and the U-plane starts RTP/RTCP interruption monitoring. If an RTP/RTCP packet is not received in the specified direction for a predetermined time, it is assumed that interruption has been detected. The NNI-GW that has detected interruption sends a notification to the C-plane using Megaco/H.248. The C-plane that receives the notification can send out a call control signal of call disconnection, alarm or the like.

CITATION LIST

Non-Patent Literature

Non-Patent Literature 1: "SIP: Session Initiation Protocol", RFC3261, IETF, June 2002
Non-Patent Literature 2: "SDP: Session Description Protocol", RFC2327, IETF, April 1998
Non-Patent Literature 3: "RTP: A Transport Protocol for Real-Time Applications", RFC3550, IETF, July 2003
Non-Patent Literature 4: "An Offer/Answer Model with the Session Description Protocol (SDP)", RFC3264, IETF, June 2002

SUMMARY OF THE INVENTION

Technical Problem

However, when RTCP sending-out conditions are changed during communication while RTCP interruption monitoring is performed, there is a possibility that it is detected as media interruption and call disconnection occurs even if there are no malfunctions in the U-plane and the terminals. A specific example of the case where a misdetection as media interruption is made will be described below.

An INVITE request transmitted by a source terminal is transmitted to a network accommodating a destination terminal that the source terminal specifies as a destination. Here, consideration will be made on a case where a setting of transfer to a terminal of another network is made for the destination terminal. The request from the source terminal reaches an AS (Application Server) on a destination network accommodating the destination terminal which is the destination, and the destination network AS that receives the request sends media including RTP/RTCP to the source side as voice guidance.

An interruption monitoring device of a source network accommodating the source terminal starts RTCP interruption monitoring, being triggered by reception of the first RTCP packet of the media transmitting the voice guidance.

The destination network AS gives the voice guidance and sends out a new INVITE request to the transfer destination terminal set in advance to transfer the INVITE request to the transfer destination terminal.

When receiving the request, the transfer destination terminal returns a response to the source terminal. When the source terminal receives the response, speech communication is started between the source terminal and the transfer destination terminal.

When the transfer destination terminal does not send out RTCP, the interruption monitoring device of the source network does not receive RTCP, and interruption is detected when an interruption monitoring timer expires. Such interruption detection is a phenomenon that may occur even if none of the U-plane and the terminals has no abnormality.

The present invention has been made in view of the above, and an object is to prevent unexpected call disconnection during normal time.

Means for Solving the Problem

A gateway device according to a first aspect of the present invention is a gateway device relaying media transfer packets and media transfer control packets to control media transfer by the media transfer packets, the gate way device including: detection means for monitoring the media transfer packets and the media transfer control packets; and generation means for, when media transfer packets are received even though reception of media transfer control packets is stopped, generating and sending out media transfer control packets based on the media transfer packets.

A gateway device according to a second aspect of the present invention is a gateway device relaying media transfer packets and media transfer control packets to control media transfer by the media transfer packets, the gate way device including: detection means for monitoring the media transfer packets and the media transfer control packets; and generation means for, when media transfer packets are received even though reception of media transfer control packets is stopped, generating and sending out a call control signal showing that media transfer is continued.

A monitoring method according to a third aspect of the present invention is a monitoring method executed by a gateway device relaying media transfer packets and media transfer control packets to control media transfer by the media transfer packets, the monitoring method including: a step of monitoring the media transfer packets and the media transfer control packets; and a step of, when media transfer packets are received even though reception of media transfer control packets is stopped, generating and sending out media transfer control packets based on the media transfer packets.

A monitoring method according to a fourth aspect of the present invention is a monitoring method executed by a gateway device relaying media transfer packets and media transfer control packets to control media transfer by the media transfer packets, the monitoring method including: a step of monitoring the media transfer packets and the media transfer control packets; and a step of, when media transfer packets are received even though reception of media transfer control packets is stopped, generating and sending out a call control signal showing that media transfer is continued.

Effects of the Invention

According to the present invention, it is possible to prevent unexpected disconnection during normal time.

BRIEF DESCRIPTION OF DRAWINGS

FIG. 2 is a flowchart showing a flow of a process of the gateway device.

DESCRIPTION OF EMBODIMENTS

Figure 1:
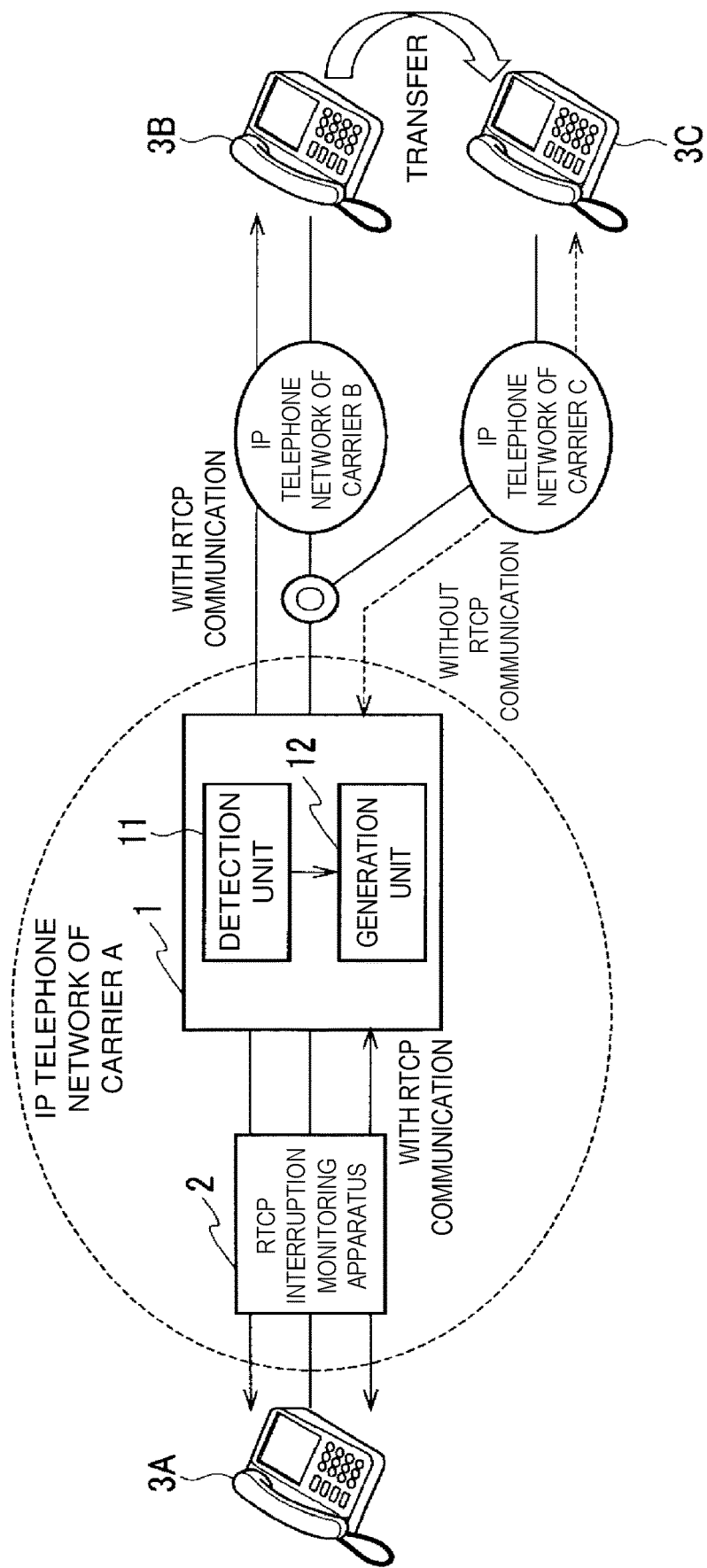
FIG. 1 is an overall configuration diagram including a gateway device in a first embodiment.

Embodiments of the present invention will be described using diagrams.

First Embodiment

FIG. 1 is an overall configuration diagram including a gateway device in a first embodiment. In an IP phone network of a carrier A, a gateway device 1 installed on a POI (Point Of Interface) among IP phone networks of carriers A, B and C, and an RTCP interruption monitoring device 2 that performs interruption monitoring of RTCP.

The gateway device 1 is provided with a detection unit 11 and a generation unit 12. Each unit that the gateway device 1 is provided with may be configured with a computer provided with a processor, a storage device and the like, and a process of each unit may be executed by a program. This program is stored in the storage device that the gateway device 1 is provided with, and it is also possible to record the program to a recording medium such as a magnetic disk, an optical disk and a semiconductor memory or provide the program through a network.

For certain communication, the detection unit 11 starts monitoring of RTP/RTCP packets, being triggered by reception of the first RTCP packet, and detects that RTCP packet sending-out conditions have been changed. Specifically, in the case of continuously receiving RTP packets even after reception of RTCP packets is stopped, the detection unit 11 determines that the RTCP packet sending-out conditions have been changed, and that the communication is continued.

When the RTCP packet sending-out conditions have been changed, and sending-out of RTCP is stopped, the generation unit 12 starts generation and sending-out of RTCP packets. The generation unit 12 can generate RTCP packets based on received RTP packets.

Next, an operation of the gateway device 1 will be described.

FIG. 2 is a flowchart showing a flow of a process of the gateway device 1. The gateway device 1 starts the process of FIG. 2, being triggered by reception of the first RTCP packet.

The detection unit 11 monitors RTCP packets that the gateway device 1 relays, and determines whether RTCP packets are received or not (step S11).

If RTCP packets are received (step S11: NO), the detection unit 11 continues monitoring of RTCP packets.

When reception of RTCP packets is stopped (step S11: YES), the detection unit 11 determines whether RTP packets are continuously received or not (step S12).

If RTP packets are continuously received (step S12: NO), the generation unit 12 starts generation/sending-out of RTCP packets (step S13). The generation unit 12 generates and sends out an RTCP packet at a predetermined timing as far as RTP packets are continuously received.

If RTP packets are not continuously received (step S12: YES), it is determined that communication ends, and the process ends.

Next, a flow of an overall process will be described.

A description will be made on an example where, in FIG. 1, a source terminal 3A accommodated in the IP phone network of the carrier A transmits a request to a destination terminal 3B accommodated in the IP phone network of the carrier B, and the IP phone network of the carrier B that receives the request transfers the request to a transfer destination terminal 3C accommodated in the IP phone network of the carrier C.

The request transmitted from the source terminal 3A is transmitted to the IP phone network of the carrier B accommodating the destination terminal 3B. An AS of the carrier B that receives the request gives voice guidance to the effect that the call is transferred to the source terminal 3A. At this time, media including RTP/RTCP are sent out as the voice guidance from the AS of the carrier B to the source terminal 3A.

The gateway device 1 and the RTCP interruption monitoring device 2 starts RTCP interruption monitoring, being triggered by reception of the first RTCP packet from the AS of the carrier B. The gateway device 1 also performs interruption monitoring for RTP packets.

The AS of the carrier B generates a new request and sends out the new request to the transfer destination terminal 3C to transfer the incoming call from the source terminal 3A to the transfer destination terminal 3C.

When receiving the request, the transfer destination terminal 3C returns a response to the source terminal 3A, and communication is established between the source terminal 3A and the transfer destination terminal 3C. Note that the transfer destination terminal 3C is a terminal that does not send out RTCP packets here.

After the communication is established between the source terminal 3A and the transfer destination terminal 3C, RTP packets are transmitted and received between the source terminal 3A and the transfer destination terminal 3C, but the transfer destination terminal 3C stops sending-out of RTCP packets. As a result, reception of RTCP packets by the gateway device 1 and the RTCP interruption monitoring device 2 is stopped.

The gateway device 1 continuously receives RTP packets even after reception of RTCP packets is stopped. Therefore, determining that the U-plane and the terminals are not abnormal, the gateway device 1 generates RTCP packets and sends out the RTCP packets to the source terminal 3A side. Note that it is assumed that time required until start of generation of RTCP packets after detection of RTCP interruption by the gateway device 1 is shorter than the interruption monitoring timer of the RTCP interruption monitoring device 2.

Though the transfer destination terminal 3C does not send out RTCP packets, the gateway device 1 generates and sends out RTCP packets. Therefore, the communication between the source terminal 3A and the transfer destination terminal 3C is continued without the RTCP interruption monitoring device 2 detecting interruption.

The gateway device 1 generates and sends out RTCP packet as far as it continuously receives RTP packets. When reception of RTP packets is stopped, the gateway device 1 ends generation of RTCP packets.

Second Embodiment

A gateway device 1 of a second embodiment is different from the first embodiment in that a generation unit 12 generates a call control signal and transmits the call control signal to the RTCP interruption monitoring device 2 without generating RTCP packets.

In the case of intermittently receiving RTP packets though reception of RTCP packets is stopped, the generation unit 12 transmits a call control signal showing that media transfer by RTP packets is continued, to the RTCP interruption monitoring device 2.

When receiving the call control signal showing that media transfer is continued, from the gateway device 1, the RTCP interruption monitoring device 2 operates to stop interruption monitoring or inhibiting call disconnection after detection of interruption.

While continuously receiving RTP packets, the gateway device 1 may periodically transmit a call control signal showing that media transfer is continued.

A detection unit 11 monitors RTP packets even after transmission of the call control signal. When reception of RTP packets is stopped, the generation unit 12 may transmit a call control signal showing that media transfer by RTP packets has ended, to the RTCP interruption monitoring device 2.

When receiving the call control signal showing that media transfer has ended, from the gateway device 1, the RTCP interruption monitoring device 2 may operate to resume interruption monitoring or execute call disconnection after detection of interruption.

As described above, according to the present embodiment, when the gateway device 1 installed on the POI border receives RTP packets even after reception of RTCP packets by the gateway device 1 has been stopped, it is possible to prevent unexpected call disconnection during normal time accompanying change in RTCP packet sending-out conditions even when interruption monitoring of RTCP packets is performed within the gateway device 1's own network by performing the following first or second process. The first process is to generate RTCP packets and send out the RTCP packets to the gateway device 1's own network side. The second process is to generate a call control signal showing that media transfer is continued and send out the call control signal to the gateway device 1's own network side.

REFERENCE SIGNS LIST

1 Gateway device
11 Detection unit
12 Generation unit
2 RTCP interruption monitoring device
3A Source terminal
3B Destination terminal
3C Transfer destination terminal

The invention claimed is:

1. A gateway device for relaying media transfer packets and media transfer control packets to control media transfer by the media transfer packets, the gateway device comprising:
    a detecting unit, including one or more processors, configured to monitor the media transfer packets and the media transfer control packets;
    a generation unit, including one or more processors, configured to, when media transfer packets are received even though reception of media transfer control packets is stopped, generate and send out media transfer control packets based on the media transfer packets,
    wherein the detection unit is configured to determine whether media transfer packets are continuously received; and
    the generation unit is configured to generate and send out media transfer control packets based on the media packets while media transfer packets are determined by the detection unit to be continuously received.

2. The gateway device according to claim 1, wherein the generation unit is configured to discontinue the generation and sending out of media transfer control packets based on the media transfer packets in response to a determination by the detection unit that media transfer packets are no longer continuously received.

3. The gateway device according to claim 1, wherein to generate and send out media transfer control packets based on the media transfer packets while media transfer packets are determined by the detection unit to be continuously received, the generation unit is configured to periodically generate and send out media transfer control packets based on the media transfer packets while media transfer packets are determined by the detection unit to be continuously received.

4. A monitoring method executed by a gateway device for relaying media transfer packets and media transfer control packets to control media transfer by the media transfer packets, the monitoring method comprising:

monitoring the media transfer packets and the media transfer control packets; and when media transfer packets are received even though reception of media transfer control packets is stopped, generating and sending out media transfer control packets based on the media transfer packets, wherein monitoring the media transfer packets and the media transfer control packets is performed in response to determining that a first media transfer packet has been received.

5. The monitoring method according to claim 4 further comprising:

determining whether media transfer packets are continuously received, wherein generating and sending out media transfer control packets based on the media transfer packets is performed while media transfer packets are determined to be continuously received.

6. The monitoring method according to claim 5 further comprising:

in response to determining that media transfer packets are no longer continuously received, discontinuing the generating and sending out media transfer control packets based on the media transfer packets.

7. The monitoring method according to claim 5, wherein the generating and sending out media transfer control packets based on the media transfer packets is performed while media transfer packets are determined to be continuously received comprises:

periodically generating and sending out media transfer control packets based on the media transfer packets while media transfer packets are determined to be continuously received.

8. A monitoring method executed by a gateway device for relaying media transfer packets and media transfer control packets to control media transfer by the media transfer packets, the monitoring method comprising:

monitoring the media transfer packets and the media transfer control packets; and when media transfer packets are received even though reception of media transfer control packets is stopped, generating and sending out a call control signal indicating that media transfer is continued, wherein the monitoring the media transfer packets and the media transfer control packets is performed in response to determining that a first media transfer packet has been received.

9. The monitoring method according to claim 8 further comprising:

determining whether media transfer packets are continuously received, wherein the generating and sending out a call control signal indicating that media transfer is continued is performed while media packets are determined to be continuously received.

10. The monitoring method according to claim 9 further comprising:

generating and sending out a call control signal indicating that the media transfer has concluded in response to determining that packets are no longer continuously received.

11. The monitoring method according to claim 9, wherein the generating and sending out a call control signal indicating that media transfer is continued comprises:

periodically generating and sending out a call control signal indicating that media transfer is continued while media transfer packets are determined to be continuously received.

\* \* \* \* \*